United States Patent [19]
Knudsen et al.

[11] Patent Number: 5,460,652
[45] Date of Patent: Oct. 24, 1995

[54] MOLTEN METAL COATING APPARATUS

[75] Inventors: Bruce A. Knudsen, Amsterdam; Mark G. Benz, Burnt Hills, both of N.Y.; Anthony Mantone; Christopher G. King, both of Florence, S.C.

[73] Assignee: General Electric Company, Schenectady, N.Y.

[21] Appl. No.: 250,733

[22] Filed: May 27, 1994

Related U.S. Application Data

[63] Continuation-in-part of Ser. No. 986,397, Dec. 7, 1992, abandoned.

[51] Int. Cl.⁶ .................................................. B05C 3/12
[52] U.S. Cl. .................................... 118/423; 118/419
[58] Field of Search ............................ 242/157 R, 615.2; 226/104, 197, 196; 118/423, 419, 420, 428; 228/56.1

[56] References Cited

U.S. PATENT DOCUMENTS

| | | | |
|---|---|---|---|
| 417,133 | 12/1889 | Barrett | 242/76 |
| 527,365 | 10/1890 | Crabtree | 242/76 |
| 1,805,145 | 5/1931 | Koops | 118/419 |
| 1,841,484 | 1/1932 | Larsen | 118/419 |
| 2,083,731 | 6/1937 | Miller | 118/419 |
| 3,890,927 | 6/1975 | Hunter | 118/419 |

*Primary Examiner*—Brenda Adele Lamb
*Attorney, Agent, or Firm*—Edmund P. Anderson; James Magee, Jr.

[57] ABSTRACT

The invention is related to a continuous coating apparatus for applying molten metal on a metal sheet or tape. The apparatus has an annular cylinder having an open lower section extending to a substantially closed upper section. An axle is mounted in the lower section normal to the cylinder axis, and a spool is mounted on the axle. A pair of tubes are mounted parallel to the cylinder axis inside the cylinder on oppositely facing surfaces so that a tape extending around the spool towards the upper section extends through the tubes.

5 Claims, 2 Drawing Sheets

MOLTEN METAL COATING APPARATUS

CROSS REFERENCE TO RELATED APPLICATIONS

This patent application is a continuation in part of patent application 07/986,397, filed Dec. 7, 1992, now abandoned.

This invention is related to a continuous coating apparatus for applying molten metal on a metal sheet or tape.

BACKGROUND OF THE INVENTION

Hot dip coating is a well known continuous method for applying a metal coating on metal sheet or tape by passing the tape through a molten bath of the metal. For example, a zinc coating can be formed on a steel sheet or tape by passing the steel tape through a molten bath of zinc.

The molten metal in the bath can react with air, the metal tape, or contaminants on the metal tape to form various oxides or metallic compounds of the molten metal. The oxides and metallic compounds form particles known as dross in the molten metal bath. It is known that some types of dross are buoyant in the molten metal, and float on the surface of the bath. Such floating dross particles can accumulate on the surface of the bath forming large agglomerations that can be deposited on the tape passing through the molten metal bath.

For some applications the coated tape must have a uniform cross section, for example to enable uniform winding of the tape to form coils. Therefore, it is desirable to form a coating having a uniform cross-section with a smooth surface finish in the continuous coating operation. However, the dross particles, and especially the agglomerated dross deposited on the tape can result in a non-uniform cross-section, and an excessively rough surface finish on the coated tape.

One aspect of this invention is a coating apparatus that minimizes the deposition of dross agglomerates on a sheet or tape being coated with molten metal.

BRIEF DESCRIPTION OF THE INVENTION

The apparatus is comprised of an annular cylinder having an open lower section extending to a substantially closed upper section. An axle is mounted in the lower section normal to the cylinder axis, and a spool is mounted on the axle. A pair of tubes are mounted inside the cylinder on oppositely facing surfaces so that a tape extending around the spool towards the upper section extends through the tubes.

A more complete understanding of the apparatus of this invention is shown by making reference to the embodiment illustrated in greater detail in the accompanying drawings and the description below.

DETAILED DESCRIPTION OF THE INVENTION

Figure 1:
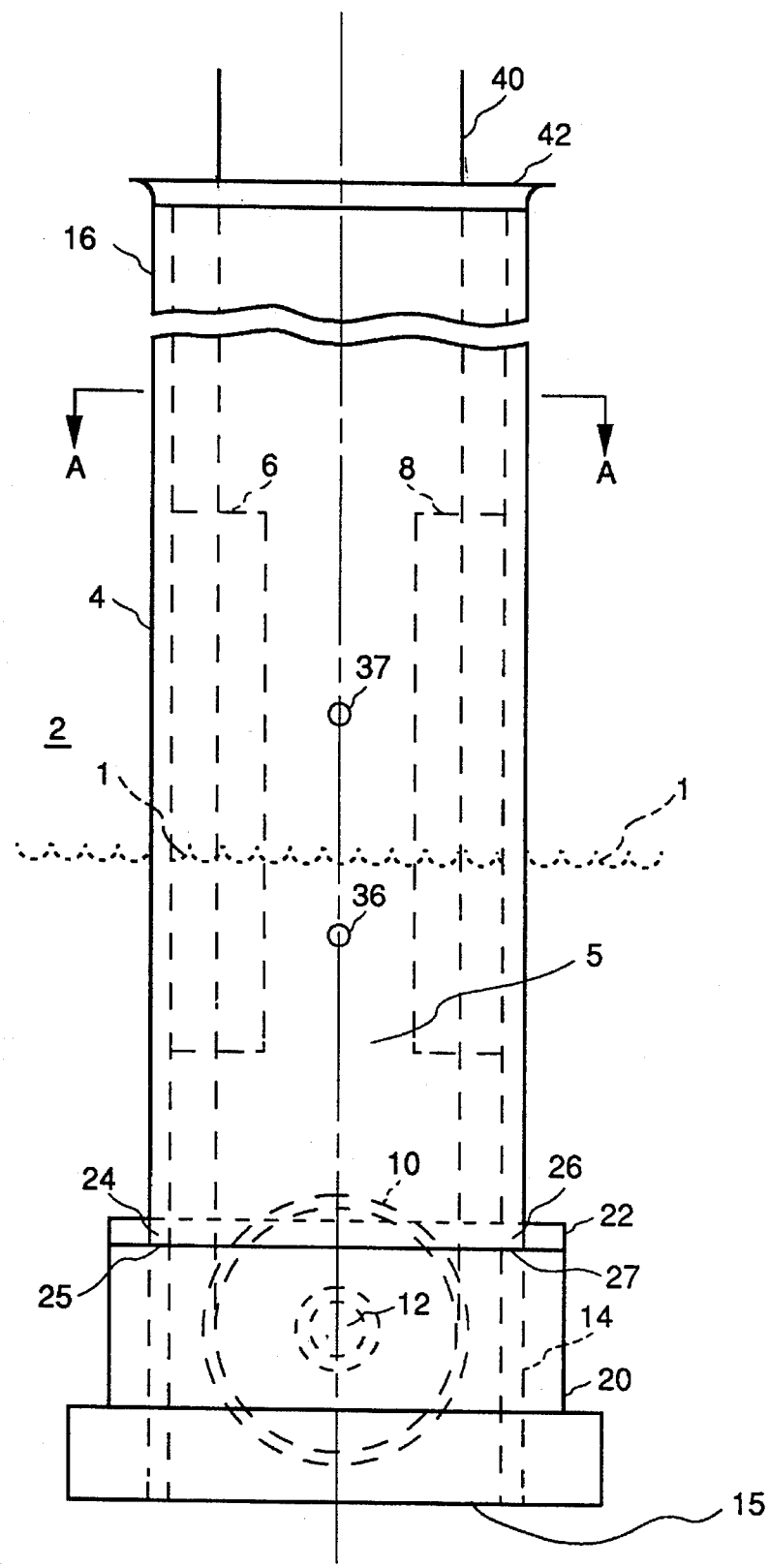
FIG. 1 is a plan view of a coating apparatus for continuous application of a molten metal coating on a metal tape.
Figure 1A:
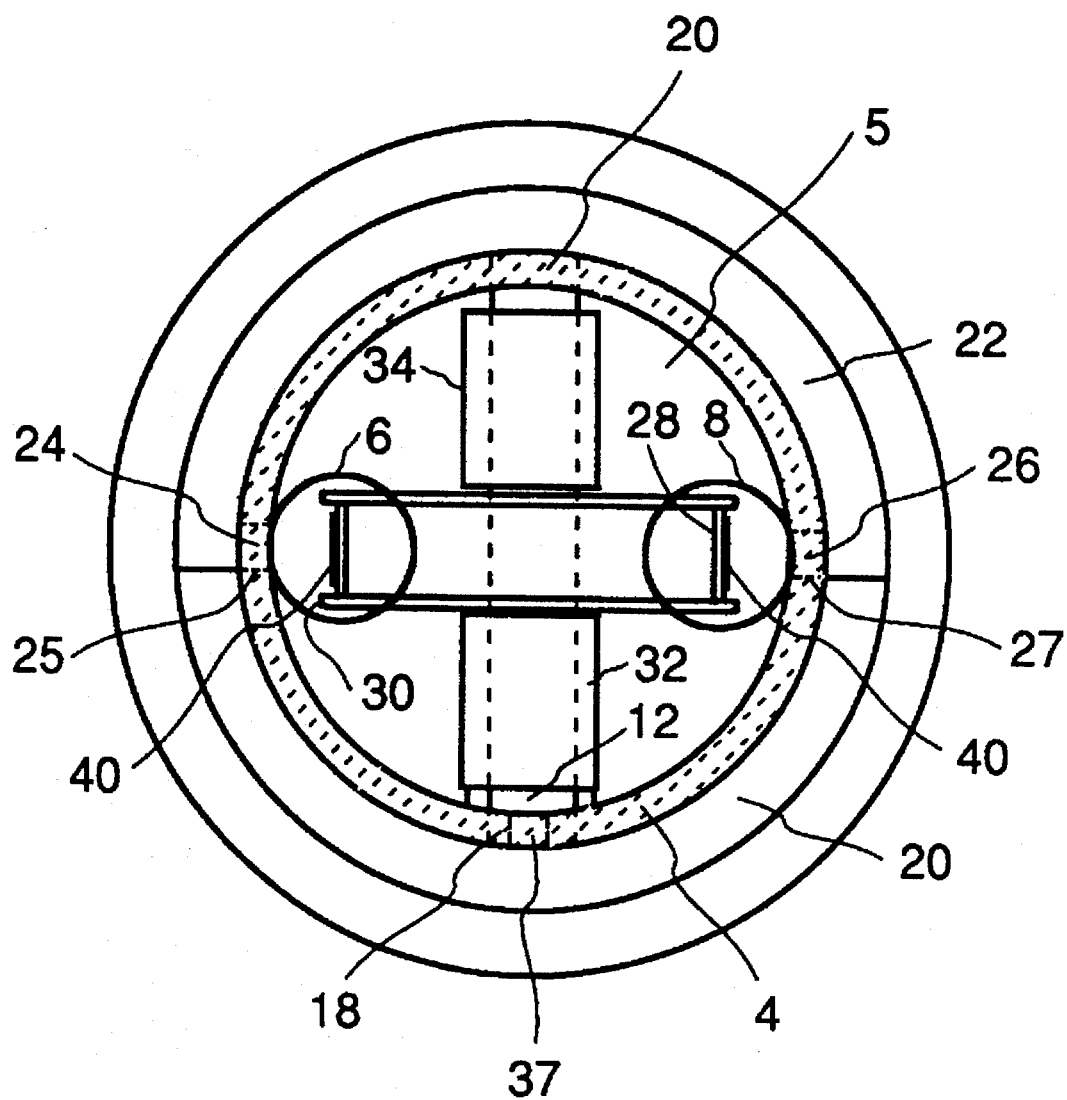
FIG. 1A is a cross-sectional view of the apparatus of FIG. 1 viewed along section plane A—A.

Referring to FIG. 1, the coating apparatus 2 of this invention is partially inserted in a bath of molten metal 1 that is to be coated on a metal sheet 40 or tape. The apparatus 2 guides a continuous length of the tape 40 into and out of the bath 1, while minimizing the deposition or pick-up of dross on the tape. The dross is present as a contaminant in the bath 1, and as the coating process proceeds the amount and size of the dross agglomerations on the bath 1 surface increases. Since the apparatus 2 of this invention minimizes the deposition of the dross, the tape 40 can be continuously coated for an increased period of time with smaller amounts and smaller agglomerations of dross being deposited thereon.

Referring again to FIG. 1, the coating apparatus 2 is comprised of an annular cylinder 4, tubes 6 and 8, and a spool 10 mounted on axle 12. The cylinder 4, and the tubes 6 and 8 are formed from a material resistant to reaction with the molten metal bath. For example, the cylinder 4, and the tubes 6 and 8 can be formed from stainless steel for operation in a zinc bath, and from quartz for operation in a tin bath.

The annular cylinder 4 extends from a substantially closed upper section 16 to a lower section 14 which is open on lower end 15, such that bath 1 may enter into the interior 5 of cylinder 4 through lower end 15 when it is lowered into the bath 1 during operation of apparatus 2. The spool 10 on axle 12 is mounted in the lower section 14 of the cylinder 4. The spool 10 and axle 12 are formed from wear resistant materials that are resistant to reaction with the molten metal bath, such as stainless steel for a zinc bath; or graphite, boron nitride, or alumina for a tin bath.

Referring to FIG. 2, the axle 12 extends through bores 18 and 20. Bores 18 and 20 extend through oppositely facing surfaces of the cylinder 4, normal to the axis of the cylinder. Preferably, the bores 18 and 20 have a diameter slightly larger than the diameter of axle 12 to provide for free turning of the spool 10. A flange 20, formed from the reaction resistant materials described above, is mounted on the lower section 14 of the cylinder 4 to extend over bores 18 and 20. A securing means 22, such as snapring clip of a design known in the art extends halfway around the outside diameter of the cylinder 4. As securing means 22, in the form of a snapring clip is pressed over the diameter of cylinder 4, securing means 22 is deformed so that upon encountering corresponding opposing bores 25 and 27 in the exterior of the cylinder 4, studs 24 and 26 on the ends of securing means 22 snap into bores 25 and 27 respectively. The securing means 22 secures flange 20 to lower section 14, and prevents the flange 20 on the lower section 14 from being displaced toward the upper section 16 when the apparatus 2 is inserted in the molten metal bath 1. Securing means 22 should also be made from a suitable reaction resistant material, such as stainless steel for use in a zinc bath, and graphite for operation in a tin bath. In a preferred embodiment, wherein the bath 1 is comprised of tin, securing means 22 comprises cylindrical graphite elements which are inserted into bores 25 and 27 so as to secure flange 20 to lower section 14

The spool 10 has an outer cylindrical surface 28 slightly wider, for example about 2 percent wider, than the width of the sheet or tape that is to be coated. The outer surface 28 has outer rims 30 at each end to prevent the .tape from slipping off the spool. Preferably, collars 32 and 34 are mounted on the axle 12, and configured to keep the spool 10 centered on the axle.

Referring back to FIG. 1, the tubes 6 and 8 are mounted on oppositely facing surfaces inside the cylinder 4 by conventional means. For example stainless steel tube's can be spot welded to a stainless steel cylinder, and quartz tubes can be fused to a quartz cylinder with a gas torch. Preferably, the fused quartz assembly is stress relief annealed. Vent holes 36 and 37 can be formed in the cylinder 4 intermediate the tubes 6 and 8 to provide for pressure equalization in the cylinder 4, so that as cylinder 4 is lowered into bath 1 and as apparatus 2 is operated as described herein, the molten metal of that portion of bath 1 located inside the cylinder 4 is maintained at the same-level as the remaining portion of bath 1 located outside the cylinder 4. For example, the apparatus 2 can be inserted in a molten metal bath 1 so the surface of the bath 1 is about midway between the vent holes 36 and 37 as illustrated. Atmosphere displaced by molten metal filling the inside of the cylinder 4 can escape through the vent holes 36 and 37.

The surface of the molten metal bath 1 falls and rises as molten metal is consumed in the coating process, and new metal is added to the bath. The tubes 6 and 8 are positioned in the cylinder 4, and have a suitable length so that a portion of the tubes extends above the surface of the bath 1, and a portion extends below the surface of the bath 1 despite any lowering or rising of the bath 1 surface. The tubes 6 and 8 have an inside diameter greater than the width of the surface 28 on the spool 10, i.e. wider than the tape or sheet to be processed through the apparatus. Preferably, the tubes are mounted within the cylinder 4 so that the greatest diameter of the tubes is aligned with the portion of the outer surface 28 facing the inner surface of the cylinder.

Preferably, an inert atmosphere such as argon is provided within the upper section 16 of the cylinder 4 to minimize oxidation of the molten metal bath 1 or the coating that is placed on the metal sheet 40. A gas seal means, not shown, is mounted over an opening, not shown, in the top 42 of the cylinder 4. In a preferred embodiment, the gas seal means can be formed from a pair of plates formed from suitable steel and extending over at least a portion of the top 42 of the cylinder 4. The plates are each formed with two corresponding cut-outs to provide for entrance and exit of the tape from the cylinder 4. A sheet of silicone rubber, not shown, is mounted between the plates, the sheet having two slits in locations corresponding with the two cut-outs to accommodate entrance and exit of the tape while providing a gas seal between the interior of apparatus 2 and the exterior ambient atmosphere. The combination of the plates and the silicone rubber sheet are mounted with conventional fasteners over the opening in the top 42 of the cylinder 4, preferably, with a gasket of silicone rubber placed therebetween, so as to seal the opening in the top 42. A suitable silicone rubber is GE RTV silicone rubber, or high temperature gasket GEC560, GE, Waterford, N.Y. A suitable inert atmosphere such as argon is provided by a conventional gas supply to the inside of cylinder 4 through a conventional gas inlet, not shown, in the upper section 16. The gas seal means permits the entrance and exit of the metal sheet 40 while also substantially preventing the escape of the inert atmosphere.

Preferably, the cylinder 4 extends a suitable distance above the surface of the molten metal bath to provide for freezing of the molten metal coating on the metal tape 401 before the tape contacts the gas seal means. In this way, streaking or scratching of the metal coating is minimized during the coating process.

In operation, a metal tape 40 supplied from a conventional pay-off reel, not shown, is threaded through the cylinder 4 extending downwardly from the upper section 16 through tube 6 to the lower section 14. The tape 40 extends around spool 10, and upwardly from the lower section 14 through tube 8 to the upper section 16. The tape extends out of the cylinder 4 to a conventional take-up reel, not shown. While maintaining a tension on tape 40 sufficient to maintain the position of the tape on the outer surface 28 of the spool 10, the apparatus 2 is lowered into the molten metal bath 1 so that the bath surface is about midway between the vents 36 and 37. The take-up reel is activated by a conventional drive system to pull the tape 40 through the molten metal bath, and a coating of the molten metal is continuously deposited thereon.

Dross forms in the molten metal bath at the bath surface, and in the bath in the area where the tape extends therethrough. Buoyant dross particles float to the bath surface and agglomerate to form large particles or sheets of the dross. If the dross agglomerates contact the tape passing into or out from the bath 1, large deposits of the dross can be deposited on the tape. The tubes 6 and 8 reduce the area of the molten metal bath 1 surface within the cylinder 4 that can come into contact with the tape 40. As a result, the deposition of agglomerations of dross particles on the tape 40 is minimized.

What is claimed is:

1. A apparatus for applying a molten metal coating on a tape or sheet, comprising:

an annular cylinder having an open lower section extending to a substantially closed upper section and a cylinder axis; an axle mounted in the open lower section normal to the cylinder axis; a spool mounted on the axle; and a pair of tubes, each tube having a top orifice and a bottom orifice, mounted parallel to the cylinder axis inside the cylinder on oppositely facing surfaces of the cylinder, wherein the tape or sheet to be coated with a molten metal is passed downwardly through the top orifice of one tube, into a bath of the molten metal, out the bottom orifice of the one tube, around the spool, upwardly through the bottom orifice of the other tube and out of the molten metal bath and the top orifice of the other tube.

2. The apparatus of claim 1, wherein the axle extends through bores within oppositely facing surfaces of the cylinder, the spool and axle being mounted to provide for free turning of the spool.

3. The apparatus of claim 2, further comprising a pair of collars on the axle to provide for a preselect position of the spool on the axle, and an annular flange mounted on the cylinder to hold the axle therein.

4. The apparatus of claim 3, wherein at least one vent hole through the cylinder is located intermediate the top and bottom of each of the tubes.

5. A apparatus for applying a molten metal coating on a tape or sheet, comprising:

an annular cylinder having an open lower section extending to a substantially closed upper section, a cylinder axis, two bores in the open lower section or oppositely facing surfaces of said cylinder; an axle mounted in the open lower section normal to the cylinder axis and extending through the bores; a spool mounted on said axle; a pair of collars mounted on said axle to provide for a preselect position of said spool on said axle; an annular flange mounted on said cylinder to hold said axle in said cylinder; a pair of tubes, each tube having a top orifice and a bottom orifice, mounted parallel to the cylinder axis inside the cylinder on oppositely facing surfaces of the cylinder; and at least one vent hole through said cylinder located intermediate the top and the bottom of said tubes wherein said spool, axle, and tubes are aligned and arranged such that the axle provides for free turning of the spool, wherein the tape or sheet to be coated with a molten metal is passed downwardly through the top orifice of one tube, into a bath of the molten metal, out the bottom orifice of the one tube, around the spool, upwardly through the bottom orifice of the other tube and out of the molten metal bath and the top orifice of the other tube.

* * * * *